(12) United States Patent
Wolfe et al.

(10) Patent No.: US 6,507,817 B1
(45) Date of Patent: Jan. 14, 2003

(54) VOICE IP APPROVAL SYSTEM USING VOICE-ENABLED WEB BASED APPLICATION SERVER

(75) Inventors: William M. Wolfe, Santa Monica, CA (US); Lewis Dean Dodrill, Richmond, VA (US); Ryan Alan Danner, Glen Allen, VA (US)

(73) Assignee: Cisco Technology, Inc., San Jose, CA (US)

(*) Notice: Subject to any disclaimer, the term of this patent is extended or adjusted under 35 U.S.C. 154(b) by 144 days.

(21) Appl. No.: 09/604,657

(22) Filed: Jun. 27, 2000

Related U.S. Application Data

(60) Provisional application No. 60/152,316, filed on Sep. 3, 1999.

(51) Int. Cl.[7] .......................... G10L 13/08; G10L 21/06; G06F 17/21
(52) U.S. Cl. .................... 704/260; 704/270.1; 704/275; 707/513
(58) Field of Search ............................... 704/258–275; 345/448–473; 707/513, 5; 358/407

(56) References Cited

U.S. PATENT DOCUMENTS

| | | | |
|---|---|---|---|
| 4,837,798 A | | 6/1989 | Cohen et al. |
| 5,907,598 A | * | 5/1999 | Mandalia et al. ............ 358/407 |
| 6,064,977 A | * | 5/2000 | Haverstock et al. ......... 707/513 |
| 6,169,545 B1 | * | 1/2001 | Gallery et al. ............... 345/748 |
| 6,212,535 B1 | * | 4/2001 | Weikart et al. .............. 707/513 |
| 6,249,291 B1 | * | 6/2001 | Popp et al. .................. 345/473 |
| 6,253,193 B1 | * | 6/2001 | Ginter et al. ................. 705/52 |
| 6,301,245 B1 | * | 10/2001 | Luzeski et al. ............. 370/352 |
| 6,321,220 B1 | * | 11/2001 | Dean et al. ..................... 707/5 |
| 6,366,651 B1 | * | 4/2002 | Griffith et al. .............. 704/260 |

OTHER PUBLICATIONS

Severance ("Could LDAP be the next killer DAP?", Computer magazine, Aug. 1997).*
Lazzaro ("Helping the Web help the disabled", IEEE Spectrum magazine, Mar. 1999).*
Bos, "XML in 10 Points", W3.org (Aug. 26, 1999).

* cited by examiner

*Primary Examiner*—Richemond Dorvil
*Assistant Examiner*—Daniel A. Nolan
(74) *Attorney, Agent, or Firm*—Leon R. Turkevich; Edward J. Stemberger

(57) ABSTRACT

A web-based voice messaging system uses an application server, configured for executing a voice application defined by XML documents, that accesses subscriber attributes from a standardized information database server (such as LDAP), and messages from a standardized messaging server (such as IMAP). The application server, upon receiving a request from a browser serving a subscriber, accesses an IP based messaging server to obtain a stored message for the subscriber from a second party. The stored message identifies a text-based form. The application server converts the text-based form into an audible format. The application server generates an HTML document to present to the subscriber the form in audible format with audible prompts, based on the HTTP request and the text-based form. The application server then updates the text-based form based on an input from the subscriber. Thus, text-based forms can be retrieved and acted on via a telephone.

30 Claims, 4 Drawing Sheets

VOICE IP APPROVAL SYSTEM USING VOICE-ENABLED WEB BASED APPLICATION SERVER

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web-based applications written by web application developers using ever-increasing availability of web development tools. Hence, the ever-increasing popularity of web applications and web development tools provides substantial resources for application developers to develop robust web applications in a relatively short time and an economical manner. However, one important distinction between telephony-based applications and web-based applications is that telephony-based applications are state-aware, whereas web-based applications are stateless.

In particular, telephony applications are state-aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific zo request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/559,637, filed Apr. 28, 2000, entitled Browser-Based Arrangement For Developing Voice Enabled Web Applications Using Extensible Markup Language Documents, the disclosure of which is incorporated in its entirety herein by reference, discloses an application server that executes a voice application defined by extensible markup language (XML) documents and dynamically generates an HTML form specifying selected application parameters from an XML document executable by the voice application. The HTML form is supplied to a browser, enabling a user of the browser to input or modify application parameters for the corresponding XML document into the form. The application server, upon receiving the form from the web browser, inserts the input application parameters into the XML document, and stores the application document for execution. Since voice applications are executed by the application server based on runtime parsing of the XML document, a user can concurrently use the HTML form to create or modify an XML document, post the HTML to the application server, and then execute the XML document to validate the inputs supplied to the HTML form. Thus, a user can easily generate XML documents and verify the corresponding voice application operation using a forms-based application development methodology.

Hence, web programmers can write voice-enabled web applications, using the teachings of the above-incorporated application Ser. No. 09/559,637, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

The use of forms has been a significant contribution to the utility of HTML for the World Wide Web. Anyone can go to a web site and fill out a form to purchase, take a survey, request information, schedule an appointment, and so on. The forms are then posted to a common gateway interface (CGI) which interprets the organized information and stores it accordingly. In the business world, such forms can eliminate the drudgery of paperwork. In many cases, these forms are processed automatically. However, some forms such as vacation requests, cell phone or pager purchase request, purchase orders, capital expense requests, etc., require human approval.

A conventional way of simplifying the request approval is to e-mail the approving party a URL that specifies a CGI request for retrieval of a submitted form. The retrieved form is then presented by the web server enabling the approving party to click on the retrieved form to accept or deny the request. The updated form is then posted to the web server for storage. This method, however, is practical only when the approving party has access to a web browser and an e-mail client on a personal computer.

SUMMARY OF THE INVENTION

There is a need for an arrangement that enables users to deploy a scalable, open standards based form approval system on an open standards based network such as an Internet Protocol (IP) network by using a telephone.

This and other needs are attained by the present invention, where an application server, configured for executing a messaging application, includes an application runtime environment configured for dynamically generating a hypertext markup language (HTML) document to present to a subscriber a text-based formn, identified in a stored message from a second party, in audible format with audible prompts, by converting the text based form into audible format and providing the prompts. The application run time environment is configured to update the text-based form based on an input from the subscriber.

Another aspect of the present invention provides a method in an application server for executing a messaging application. The method includes receiving an HTTP request for execution of a prescribed messaging application operation for a subscriber. A stored message for the subscriber from a second party is accessed from an IP-based messaging server. The stored message identifies a text-based formn. The application server converts the text-based form into an audible format. The application server generates an HTML document to present to the subscriber the form in audible format with audible prompts, based on the HTTP request and the text based message. The application server then updates the text-based form based on an input from the subscriber.

Thus, by use of the application server, a subscriber or approving party can receive a text-based form, identified by a second party, converted to audio format and take action with regard the form contents by use of a telephone or a computer having a web browser.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
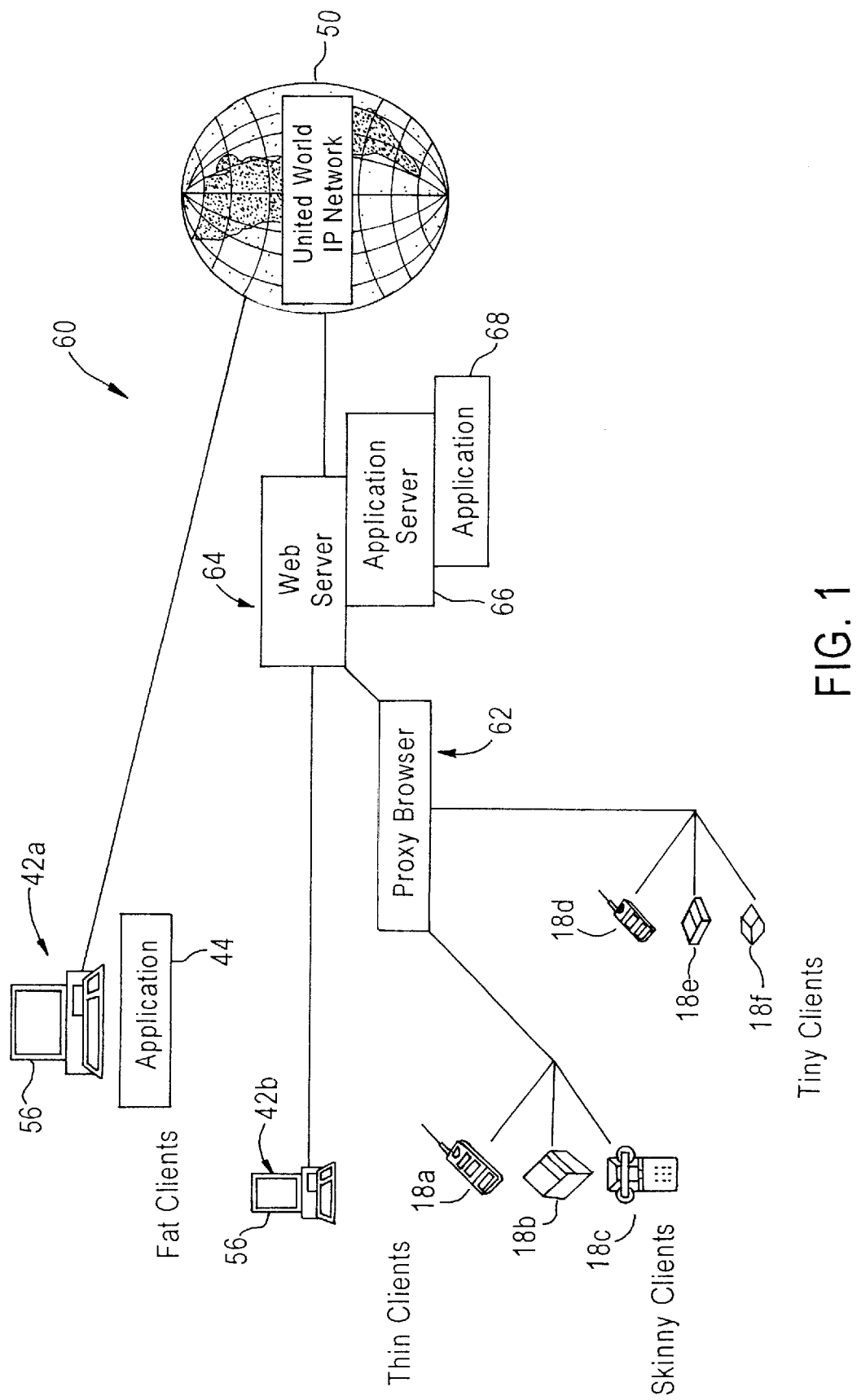
FIG. 1 is a block diagram illustrating a system enabling deployment of a messaging system, capable of executing voice enabled web applications, according to an embodiment of the present invention.

FIG. 1 is a block diagram illustrating an architecture that provides unified voice messaging services and data services via an IP network using browser audio control according to an embodiment of the present invention. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18*a* and telephone 18*c* would receive analog audio signals played by the proxy browser 62 and no text information (unless a display is available); the fax machine 18*b* and pager 18*f* would only receive data/text information, and the cellular telephone 18d and the handheld computing device 18*e* would receive both voice and data information. Hence, the proxy browser 62 interfaces between the IP network and the respective local access devices for the skinny clients and the tiny clients to provide access to the unified messaging network 60.

Figure 2:
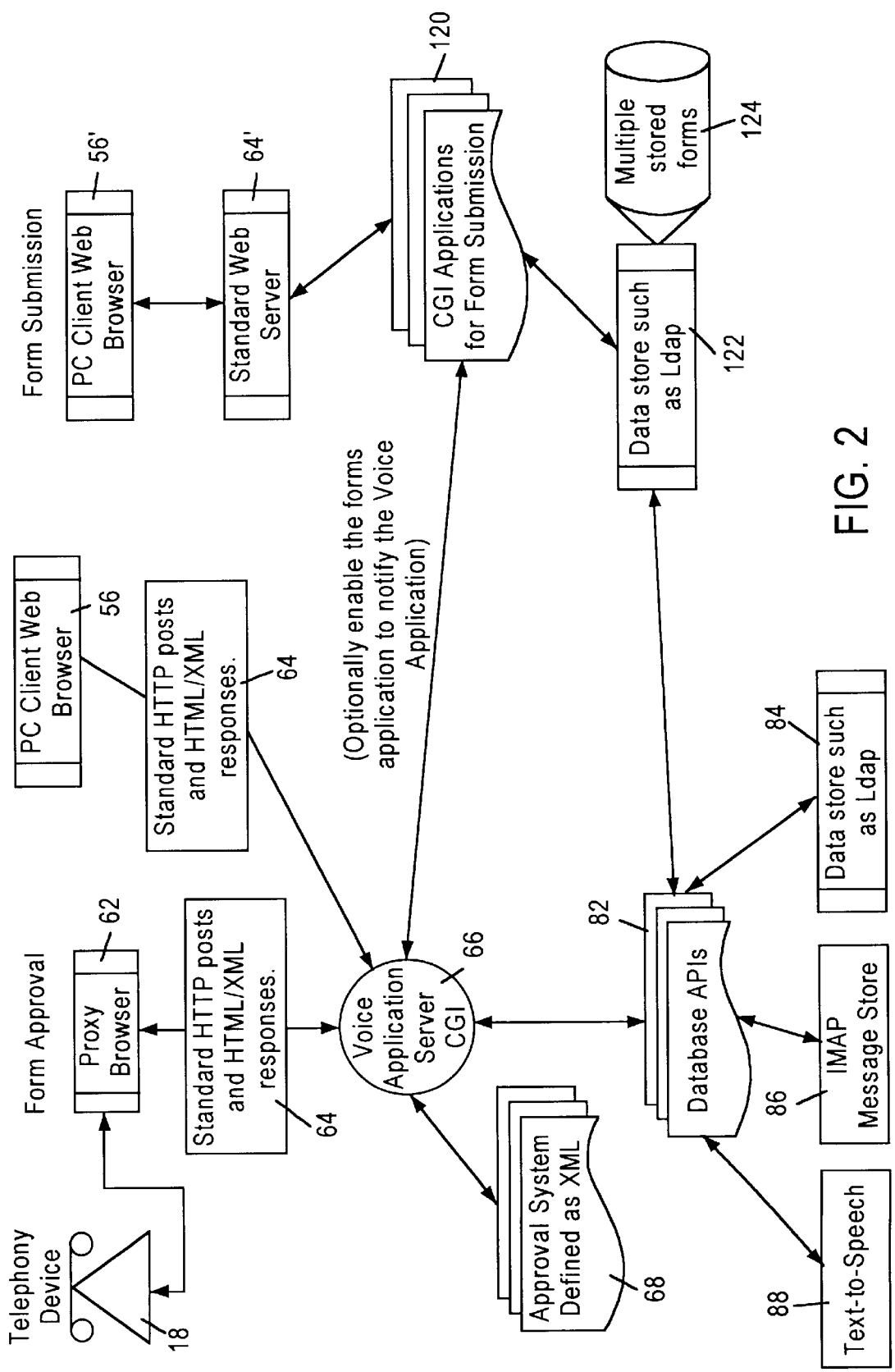
FIG. 2 is a diagram illustrating interactions by the application server of FIG. 1 with resources via an IP network for execution of form submission and approval according to an embodiment of the present invention.

The proxy browser 62 and the web browsers 56 within the fat client 42*a* and the thin client 42*b* execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages 68 (i.e., XML pages that define an application) and in response generate new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 56 or 62.

FIG. 2 is a diagram illustrating in further detail the form submission and approval system implemented by the voice application server 66 according to an embodiment of the present invention. With regard to form submission, the submitting party's browser 56' sends a request via the web server 64' for form submission. A forms submission common gateway interface (CGI) 120 responds to the HTTP request by accessing the forms database 124 for retrieval of the selected blank HTML-based form. The blank form is presented by the web server 64' to the browser 56' for data input by the submitting party. The submitting party completes the form and posts the completed form to the web server 64' using a prescribed URL, causing the CGI interface 120 to store the completed form in a data store 122. As shown in FIG. 2, optionally, the CGI 120 can notify the voice application server 66 that a form has been completed by a submitting party.

The form may have a record function so that the submitting party can record a message to be played for the approving party as an audio (.wav) file. The form may also have an entry field for the telephone number of the approving party so that when the form is submitted by the submitting party, a proxy browser 62 can cause a telephony device to call or page the approving party notifying him or her of the message.

Once the submitting party posts the form to the web server 64', the CGI parses the form to determine status and generates a message (e.g., e-mail) to the approving party specified in the completed form using database APIs 82 (e.g., SMTP service for storage of e-mail messages in IMAP 86).

With regard to form approval, the application server 66 receives, via the web server 64, HTTP requests from either a PC-based web browser 56 capable of supplying full media content (e.g., audio, text, images, and streaming video), or a lightweight or proxy browser 62 configured for serving as an HTTP interface for a user input device, such as a telephone 18, having limited media capabilities (e.g., audio only). In response to receiving the HTTP requests, the voice application server 66 accesses a selected XML document 68 that defines an application operation to be performed, based on parameters specified within the HTTP request, and based on application state determined from accessing a brownie, assuming the HTTP request specifies a valid session identifier. As described below, the application runtime environment within the voice application server 66 parses the XML tags within the accessed XML document 68, and dynamically generates a first HTML page having XML tags that specify media content (e.g., .wav files) and control information for playing the media files by the corresponding browser. The proxy browser 62 is configured for parsing a prescribed portion of a prescribed group of media tags.

The voice application server 66 is configured for accessing service application programming interfaces (APIs) 82 to. external resources based on prescribed procedures that may be called during parsing of an XML tags in a selected XML document 68. As described below, the application server 66 issues function calls to an API 82 for accessing the external resources for prescribed operations. In particular, the application server 66 accesses subscriber profile information from an. IP-based database server 84 according to lightweight directory access protocol (LDAP). As disclosed in commonly assigned, co-pending application Ser. No. 09/588,293, filed Jun. 7, 2000, entitled Unified Messaging System Using Web Based Application Server For Management of Messages Using Standardized Servers the disclosure of which is incorporated in its entirety herein by reference, the application server 66 may issue function calls for storing and retrieving messages in a standardized format (e.g., e-mail with binary encoded attachments) in an internet message access protocol (IMAP) messaging server 86, or for a text-to-speech resource 88.

Hence, the voice application server 66 may access the text-to-speech resource 88 for converting an e-mail text message into an audio-based message to be played for the user of the telephony device 18. As described in further detail below, this audio-based playback of an e-mail message stored in the IMAP message store enables a user of the telephony device 18 to approve submitted forms using the telephone 18.

Figure 3:
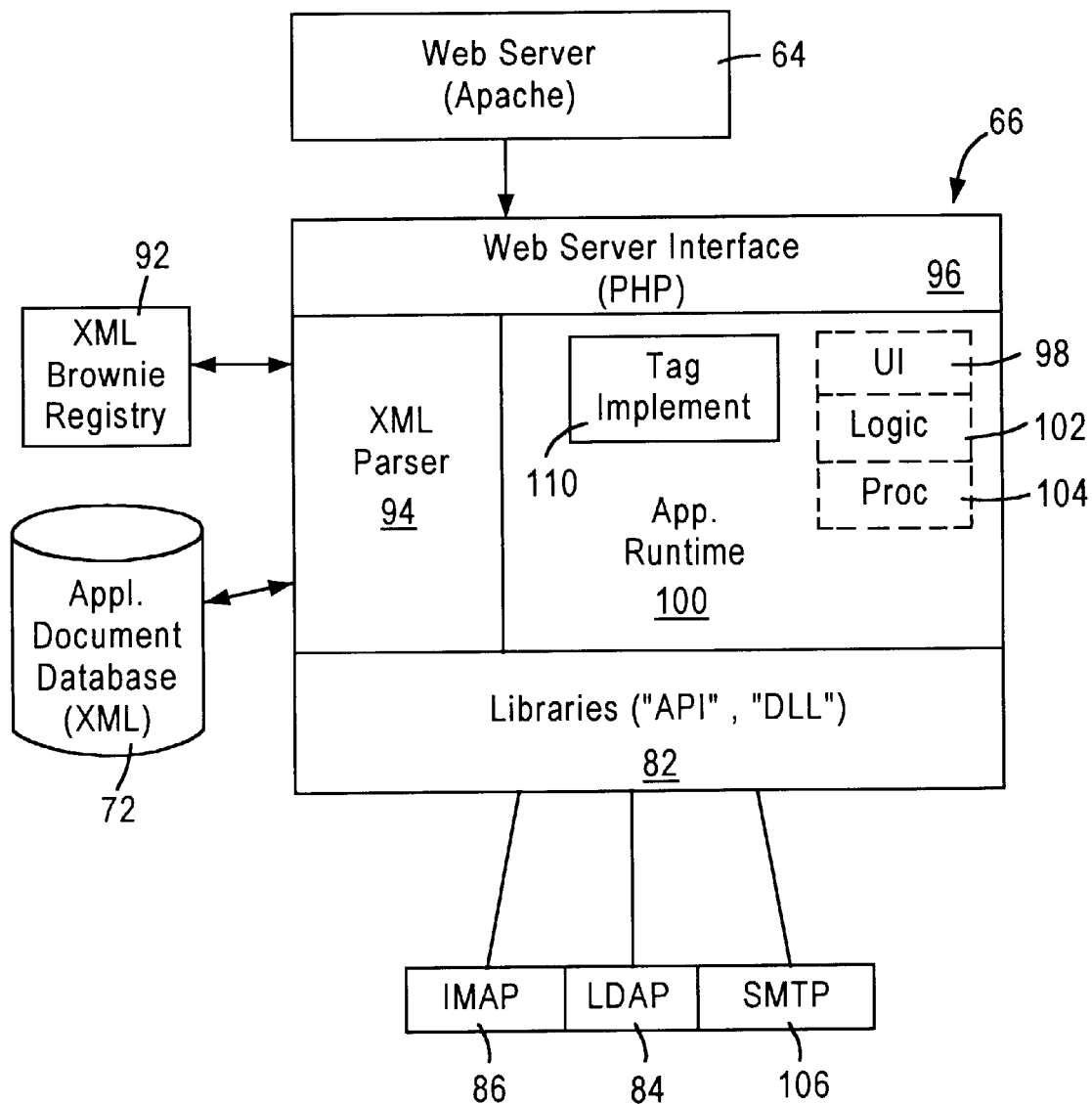
FIG. 3 is a diagram illustrating in detail the application server of FIGS. 1 and 2 according to an embodiment of the present invention.

FIG. 3 is a diagram illustrating in detail the application server 66 according to an embodiment of the present invention. The application server 66 is implemented as a server executing a PHP hypertext processor with WL parsing and processing capabilities, available open source on the Internet at http://www.php.net. As shown in FIG. 3, the server system 66 includes an XML parser 94 configured for parsing the application-defining XIL documents 68 stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 100 to implement the procedures 104 as specified by the appropriate XML document. For example, the application server 66 may issue a function call to one of a plurality of IP protocol compliant remote resources 86 (IMAP protocol), 84(LDAP protocol), 106 (SMTP protocol), or 122 (LDAP protocol) (FIG. 2) described below. For example, the PHP hypertext processor includes executable routines capable of accessing the IMAP or LDAP services. Note that the mechanisms for accessing the services 86, 84, 106, or 122 should be established within the application server before use of XML documents that reference those services. Once the services 86, 84, 106, or 122 are established, the application runtime environment 100 can perform a function operation by using executable functions specified by a function call rule set.

The arrangement for form approval operations will now be described.

Figure 4:
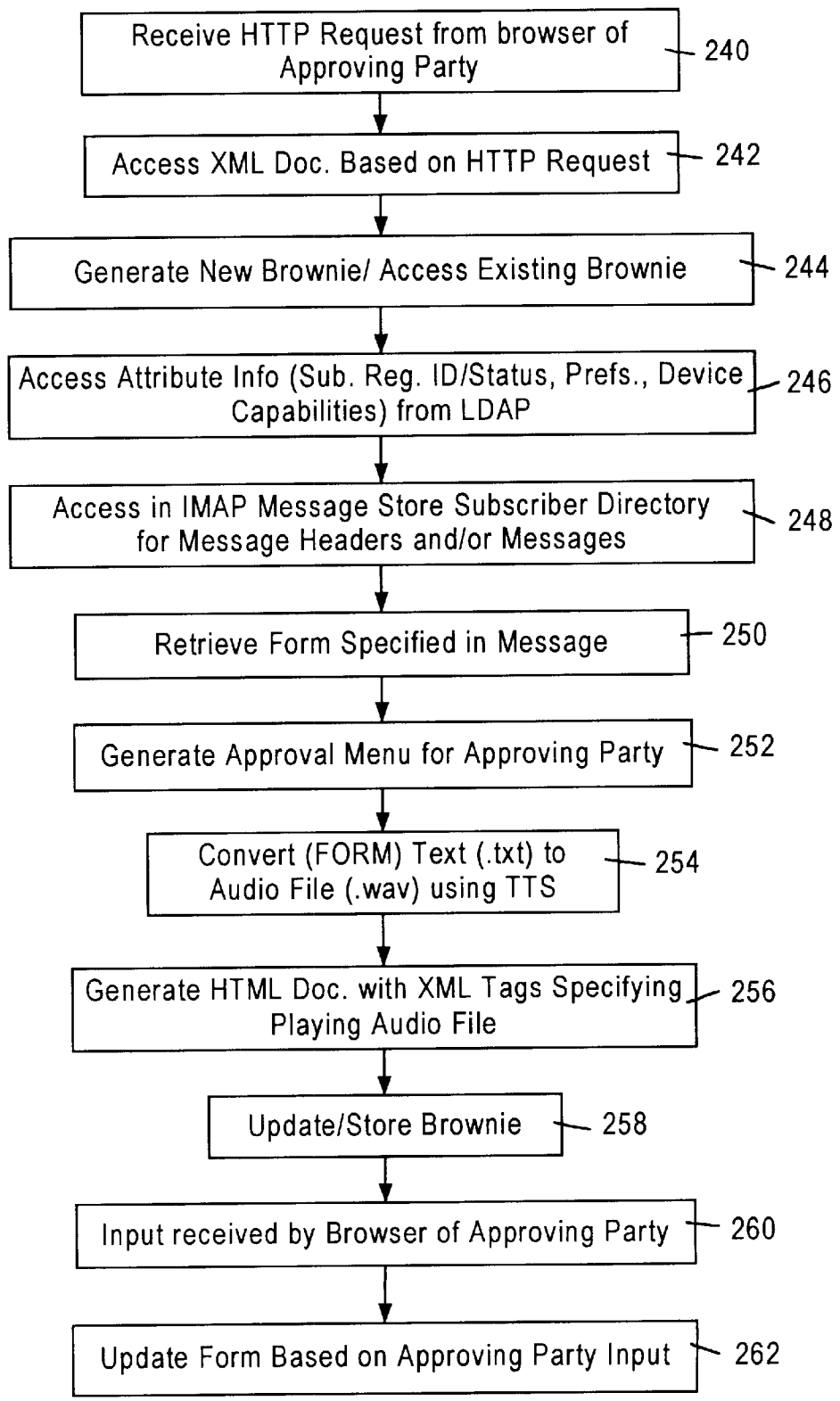
FIG. 4 is a diagram illustrating the execution of an approval operation according to an embodiment of the present invention.

FIG. 4 is a diagram illustrating form approval operations executed by the application server 66 according to an embodiment of the present invention. The application server 66 is configured for distributing messaging operations by obtaining subscriber information from the LDAP message store 84, and storing and retrieving messages on the IMAP message store 86 in the form of an e-mail messages. Message format conversion may be necessary, depending on the capabilities of the device coupled to the proxy browser 62. For example, a user having a conventional telephone capable only of audio input and output may need the text-to-speech resource 88 in order to listen to e-mail messages. The steps described in FIG. 4 can be implemented as executable code stored on a computer readable medium (e.g., a hard disk drive, a floppy drive, a random access memory, a read only memory, an EPROM, a compact disc, etc.).

As illustrated in FIG. 4, the application server 66 receives in step 240 an HTTP request from the browser 56 or 62 serving the subscriber or approving party. In response, the application server 66 accesses an XML document 68 from the database 72 in step 242, and generates a new brownie or accesses an existing brownie in step 244. The application server 66 then accesses the subscriber attribute information in step 246 from the LDAP directory 84, for example subscriber identity, subscriber status, preferences, and device capabilities. The application server 66 also accesses the user's IMAP directory in step 248 to retrieve an e-mail message which identifies an approval form, based on the subscriber profile information obtained in step 246. If the form is not part of the e-mail message, the application server 66 uses a URL within the e-mail message that specifies the form to retrieve the specified form the data store 122 in step 250. In step 252, the application server 66 generates an approval menu or audible prompts for the approving party based on parsing the retrieved HTML form. The application server 66 converts the text-based form into an audio file using the text-to-speech resource 88 in step 254. The application server 66 then generates an HTML document having XML tags that specify playing of the audio file in step 256 and forwards the HTML document to the browser 56 or 62 for execution. The application server 66 then updates and stores the brownie in step 258. Thus, the audio file played by the browser may be: "John, this is Joe. Can I purchase a cell phone for $200? Press 1 to approve or press 2 to deny."

The browser 56 or 62 receives an input in step 260 from the approving party, for example a 1 to approve the request or a 2 to deny the request. The approving party may attach an audio message (.wav file) giving reasons for the decision. In step 262, the application server 66 updates the form in the data store 122 based on the approving party's input by issuing a function call to the database API 82. Alternatively, the application server 66 may respond to a pending CGI request.

According to the disclosed embodiment, a submitting party may submit a request for approval over an IP network and the approving party, either by telephone or by personal computer, can approve or deny the request. The ability to make the approval by telephone gives the approving party greater flexibility in the approval process since the approving party need not have access to a personal computer having a browser and with e-mail software.

While this invention has been described in connection with what is presently considered to be the most practical and preferred embodiment, it is to be understood that the invention is not a limited to the disclosed embodiments, but, on the contrary, is intended to cover various modifications and equivalent arrangements included within the spirit and scope of the appended claims.

What is claimed is:

1. A method in an application server for executing a messaging application, the method comprising:

receiving an HTTP request for execution of a prescribed messaging application operation for a subscriber;

accessing an IP-based messaging server to obtain a stored message for the subscriber from a second party, the stored message identifying a text-based formn;

converting the text-based form into an audible format;
generating an HTML document to present the form in audible format with audible prompts based on the HTTP request and the text-based form; and
updating the text-based form based on an input from the subscriber.

2. The method of claim 1, further including accessing attribute information for the subscriber from an Internet Protocol (EP) based database server configured for storing subscriber attributes, the step of accessing the messaging server being based on the accessed attribute information.

3. The method of claim 1, wherein the receiving step includes recovering within the HTTP request a browser configuration.

4. The method of claim 3, wherein the recovering step includes identifying the browser configuration as one of a computer browser configuration configured for parsing a prescribed group of media tags and presenting a prescribed group of media types, and a lightweight browser configuration configured for parsing a prescribed portion of the prescribed group of media tags.

5. The method of claim 4, wherein the generating step includes generating the HTML document by selectively supplying media tag types based on the identified browser configuration.

6. The method of claim 1, further including retrieving the text-based form from a data store prior to the converting step.

7. The method of claim 1, wherein the accessing step includes accessing the IP-based database server according to LDAP protocol.

8. The method of claim 1, wherein the converting step includes executing a text to speech resource for converting the text-based form into an audio file.

9. The method of claim 1, wherein the message from the second party includes instructions for the subscriber to approve or deny a request, and the audible prompts include options for approving or denying the request.

10. The method of claim 1, wherein the step of generating an HTML document provides XML tags that specify the playing of the form in the audible format.

11. An application server configured for executing a messaging application, the application server including:
an application runtime environment configured for dynamically generating a hypertext markup language (HTML) document to present to a subscriber a text-based form, identified in a stored message from a second party, in audible format with audible prompts, by converting the text based form into audible format and providing the prompts, the application run time environment being configured to update the text-based form based on an input from the subscriber.

12. The server of claim 11, wherein the application runtime environment is configured to access attribute information for the subscriber from an Internet Protocol (EP) based database server configured for storing subscriber attributes, the application runtime environment accessing the stored message from a messaging server based on the accessed attribute information.

13. The server of claim 11, wherein the application runtime environment accesses the IP-based database server and the IP-based messaging server according to LDAP protocol and IMAP protocol, respectively.

14. The server of claim 12, wherein the application runtime environment is configured for converting the text based form into an audio file playable by a browser and inserting the audio file into the HTML document.

15. The server of claim 14, wherein the application runtime environment is configured for converting the text based form into an audio file using a text to speech routine.

16. The server of claim 11, wherein the HTML document includes XML tags that specify the playing of the form in the audible format.

17. A computer readable medium having stored thereon sequences of instructions for executing a messaging application, the sequences of instructions including instructions for performing the steps of:
receiving an HTTP request for execution of a prescribed messaging application operation for a subscriber;
accessing an IP-based messaging server to obtain a stored message for the subscriber from a second party, the stored message identifying a text-based form;
converting the text-based form into an audible format;
generating an HTML document to present the form in audible format with audible prompts based on the HTTP request and the text-based form; and
updating the text-based form based on an input from the subscriber.

18. The medium of claim 17, further including accessing attribute information for the subscriber from an Internet Protocol (IP) based database server configured for storing subscriber attributes, the step of accessing the messaging server being based on the accessed attribute information.

19. The medium of claim 17, wherein the receiving step includes recovering within the HTTP request a browser configuration.

20. The medium of claim 19, wherein the recovering step includes identifying the browser configuration as one of a computer browser configuration configured for parsing a prescribed group of media tags and presenting a prescribed group of media types, and a lightweight browser configuration configured for parsing a prescribed portion of the prescribed group of media tags.

21. The medium of claim 19, wherein the generating step includes generating the HTML document by selectively supplying media tag types based on the identified browser configuration.

22. The medium of claim 17, wherein the accessing step includes accessing the IP-based database server according to LDAP protocol.

23. The medium of claim 17, wherein the converting step includes executing a text to speech resource for converting the text based form into an audio file.

24. The medium of claim 17, wherein the stored message of the second party includes instructions for the subscriber to approve or deny a request, and the audible prompts include options for approving or denying the request.

25. The server of claim 17, wherein the HTML document includes XML tags that specify the playing of the form in the audible format.

26. An application server configured for executing a messaging application, the application server including:
means for dynamically generating a hypertext markup language (HTML) document to present to a subscriber a text-based form, identified in a stored message from a second party, in audible format with audible prompts, by converting the text based form into audible format and providing the prompts, the generating means being configured to update the text-based form based on an input from the subscriber.

27. The server of claim 26, wherein the generating means includes means for accessing the IP-based database server and the IP-based messaging server according to LDAP protocol and IMAP protocol, respectively.

28. The server of claim 26, wherein the generating means is configured for converting the text based form into an audio file playable by a browser and inserting the audio file into the HTML document.

29. The server of claim 26, wherein the generating means is configured for converting the text based form into an audio file using a text to speech routine.

30. The server of claim 26, wherein the HTML document includes XML tags that specify the playing of the form in the audible format.

* * * * *

UNITED STATES PATENT AND TRADEMARK OFFICE
CERTIFICATE OF CORRECTION

PATENT NO.  : 6,507,817 B1
DATED       : January 14, 2003
INVENTOR(S) : Wolfe et al.

Page 1 of 1

It is certified that error appears in the above-identified patent and that said Letters Patent is hereby corrected as shown below:

<u>Column 8,</u>
Line 67, delete "formn" and insert -- form -- therefor.

Signed and Sealed this

Eleventh Day of November, 2003

JAMES E. ROGAN
*Director of the United States Patent and Trademark Office*